United States Patent [19]
Katznelson

[11] Patent Number: 6,093,566
[45] Date of Patent: Jul. 25, 2000

[54] FLOW-THROUGH SYSTEM AND METHOD FOR TOXICITY TESTING

[76] Inventor: Revital Katznelson, 728 Adams St. Apt. 5, Albany, Calif. 94706

[21] Appl. No.: 09/100,739

[22] Filed: Jun. 19, 1998

[51] Int. Cl.[7] .............................. C12M 1/34; A01K 61/00
[52] U.S. Cl. ..................................... 435/287.1; 435/288.1; 435/288.7; 435/29; 435/32; 435/33; 119/204; 119/224; 424/9.1
[58] Field of Search ................................ 435/29, 32, 33, 435/287.1, 288.1, 288.7; 73/53.01; 119/204, 224, 226, 228; 424/9.1

[56] References Cited

U.S. PATENT DOCUMENTS

| | | | |
|---|---|---|---|
| 4,626,992 | 12/1986 | Greaves et al. | 364/418 |
| 4,723,511 | 2/1988 | Solman et al. | 119/3 |
| 5,804,705 | 9/1998 | Florion et al. | 73/61.41 |

FOREIGN PATENT DOCUMENTS

| | | |
|---|---|---|
| 0 045 623 | 2/1982 | European Pat. Off. . |
| 29 06 884 | 8/1980 | Germany . |
| 37 08 753 | 9/1988 | Germany . |
| 9-292389 | 11/1997 | Japan . |

OTHER PUBLICATIONS

Knatznelson et al. Spatial and Temporal Variations in Toxicology in an Urban–Runoff Treatment Marsh.; Environmental Toxicity and Chemistry. vol. 14, No. 3 (1995), pp. 471–482.

Katznelson et al. Caplus Abstract 122:141794 of Environ. Toxicol. Chem. (1995), 14(3), pp. 471–482, 1995.

Kercher et al. Caplus Abstract 127:126173 of Toxic Subst. Water Environ., Proc. (1995), Feb. 13–Feb. 22, 1995.

Baker et al. Caplus Abstract 102:199188 of Report (1984) EPA/600/4-84/087, 1984.

U.S. Environmental Protection Agency, Short–term methods for estimating the chronic toxicity of effluents and receiving waters to freshwater organisms, 2nd ed., 1989, Section 12 pp. 105–126 EPA–600/4–89–001; U.S. Environmental Protection Agency, Cincinnati, OH; USA.

Brooks, AS, Szmania, DG, and Goodrich, MS, "A comparison of continuous and intermittent exposures of four species of aquatic organisms to chlorine" Final research report, Mar. 1989, 145 pp., The Center for Great Lakes Studies, University of Wisconsin, Milwaukee, Wisconsin, USA.

Benoit, DA, Phipps, GL, and Ankley, GT, "A sediment testing intermittent renewal system for the automated renewal of overlying water in toxicity tests with contaminated sediments", *Water Research* 1993, pp. 1403–1412 vol. 27, Pergamon Press, Great Britain.

Jones, PA and Sloan, RJ, entitled "An in situ river exposure vessel for bioaccumulation studies with juvenile fish", *Environmental Toxicology and Chemistry* 1989, pp. 151–155 vol. 8, Pergamon Press, USA.

Knezovitch, J.P., Steichen, D.J., Jelinski, J.A. and Anderson, S.L., "Sulfide tolerance of four marine species used to evaluate sediment and pore–water toxicity". Bull. Environ. Contam. Toxicol., 1996, pp. 450–457, vol. 57, Springer–Verlag New York Inc., USA.

U.S. Environmental Protection Agency, "Methods for measuring the toxicity and bioaccumulation of sediment–associated contaminants with freshwater invertebrates" Jun. 1994, Appendix B pp. 109–119 EPA–600/R–94/024; U.S. Environmental Protection Agency, Duluth, Minnesota; USA.

Katznelson, R., Dacosta, E, and A.Y. Feng. Creekside Flowthrough System for Toxicity Testing at Realistic Exposure Scenarios.. in: Abstracts of the eighth annual meeting of the NorCal Society of Environmental Toxicology and Chemistry, Jun. 22–23, 1998, Reno, NV, pp. 28.

*Primary Examiner*—William H. Beisner

[57] ABSTRACT

A method and apparatus for evaluating the effects of toxic substances in the environment on aquatic organisms is disclosed. The apparatus allows for exposure of test organisms, placed in test chambers made of partially submerged sieves, to water that is pumped from an urban creek at preset time intervals. The invention also allows for maintenance of cool temperatures in the exposure chambers, both for the treatment (i.e., creek water) and the experimental control.

15 Claims, 2 Drawing Sheets

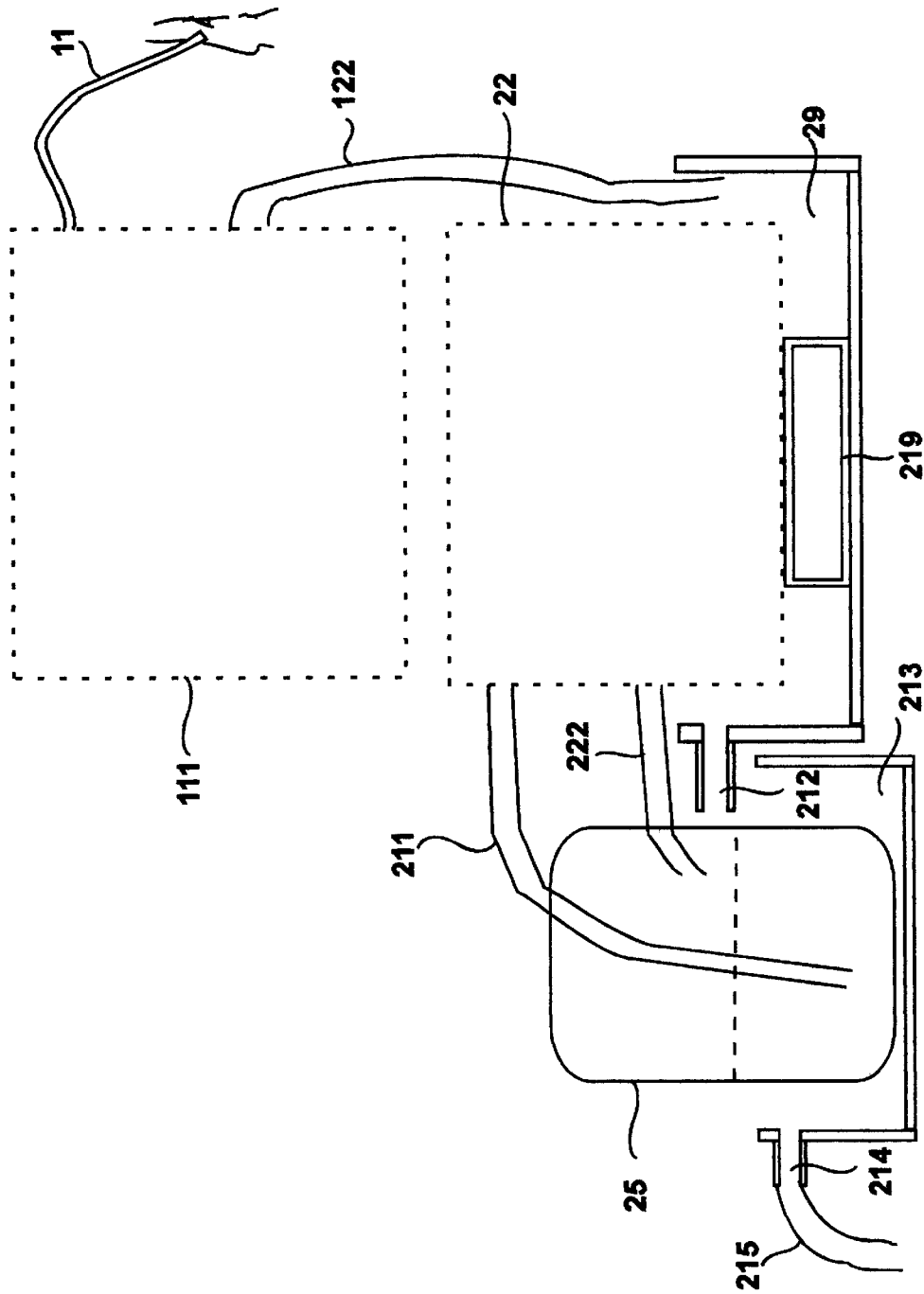

FLOW-THROUGH SYSTEM AND METHOD FOR TOXICITY TESTING

BACKGROUND OF THE INVENTION

1. Field of the Invention

The present invention is generally directed towards the field of testing levels of substances in fluids and in particular to the field of toxicity testing, using test organisms, for the purpose of evaluating the effects of environmental pollutants. The present invention is also directed towards the field of laboratory toxicity tests, as well as flow-through tank systems and cages that are deployed in water bodies to test the toxicity in situ (under real-time exposure conditions).

2. Description of the Prior Art

Laboratory toxicity tests, in which test organisms are exposed to test solutions in test chambers held under controlled environmental conditions, are commonly used to evaluate the toxicity of discharges into surface waters. For example, storm water runoff samples are collected in urban creeks with an automatic pump that can collect flow-weighed composite sample or discrete samples. The samples collected in the creek during the runoff event may be tested in the laboratory using static-renewal 7-day toxicity tests according to the EPA protocol as published by the U.S. Environmental Protection Agency section 12 of in a document entitled Short-term methods for estimating the chronic toxicity of effluents and receiving waters to freshwater organisms, 2nd ed. EPA-600/4-89-001; Cincinnati, Ohio; 1989. The test organism *Ceriodaphnia dubia*, a small crustacean, is a standard test organism that is often used in these tests. The problems associated with this test methodology are related to the fact that a water sample, taken away from the creek at one point in time, does not necessarily reflect the conditions in the creek after that time and yet it has been continuously used for renewal to simulate exposure.

Another technique of toxicity testing involves the use of tanks that hold test organisms, through which the tested solutions constantly flow. Various pumps are used to move the tested water into the tank or out of the tank. Intermittent flow systems with self starting siphons have also been used in toxicity testing, for example as described in a report by Brooks, A S, Szmania, D G, and Goodrich, M S entitled "A comparison of continuous and intermittent exposures of four species of aquatic organisms to chlorine" submitted on March 1989 to the Center for Great Lakes Studies, University of Wisconsin, Milwaukee, Wis. However, flow-through tank systems cannot assure replacement of the entire exposure volume in a way that simulates the water flowing past a creek organism that lives on the rocks or the plants in a creek. Moreover, the assessment of organism survival depends on the operator's ability to observe the test organisms at preferred time intervals, which limits the choice of test organisms to those that are large enough to be observed in a big tank.

A variation on the flow-through toxicity test system involves periodic distribution of replacement solutions, using flow splitters of various designs, into individual test chambers. A distribution tray with nozzles made of pipette tips (for even distribution of liquids among receiving containers) are used in sediment toxicity testing systems, for example as reported in an article by Benoit, D A, Phipps, G L, and Ankley, G T entitled "A sediment testing intermittent renewal system for the automated renewal of overlying water in toxicity tests with contaminated sediments", as appeared in *Water Research* Vol 27 pp. 1403–1412 (1993).

In situ exposure systems for evaluating conditions within a water body consist of a variety of cages in which test organisms are enclosed, deployed in the environment for a variety of time periods. Large-volume cages, which have been used to deploy fish in the Hudson River, were described in an article by Jones, P A and Sloan, R J, entitled "An in situ river exposure vessel for bioaccumulation studies with juvenile fish", as appeared in *Environmental Toxicology and Chemistry* Vol. 8, pp. 151–155 (1989). The cages can be taken out for survival observations and deployed again, but the size of the test organisms is limited to that which can be observed in a large cage and retained in the cage by a net with relatively large pore openings. The pore openings of the nets used to construct these prior art cages have to be large enough to assure that the net is not clogged during the test, and that there is no accumulation of silts in the cage. Even if such nets do not become clogged, at low flow rates there is no assurance that ambient water actually circulates through the cage. An additional problem that has been observed in these prior art systems deployed in urban creeks is that in the absence of rapid circulation during low flow rates, water temperatures in the cages may rise if the surrounding water or the cages themselves are exposed to intense solar irradiation. On the other hand, cages deployed during periods of high flow rates in creeks are subject to rapid movement in the swift currents, and the cage wall may cause mechanical stress to the test organisms, rendering such organisms' survival characteristics a less relevant toxicity indicator.

In summary, prior art toxicity testing systems include numerous toxicity testing protocols for the laboratory, automatic sampling devices, contraptions and cages for in situ exposures, as well as flow-through tanks of different sizes and fluid-replacement technologies. These prior art systems have the drawbacks described above, all of which detract from their reliability, consistency and utility as relevant toxicity testing tools.

SUMMARY OF THE INVENTION

The present invention improves over the prior art related to nozzles made of pipette tips for even distribution of liquids among receiving containers, sieves for separation of solids from liquids and a net to contain test organisms within a chamber. However, the present invention further provides for the combined use of open, partially submerged sieves serving as flow-through toxicity test chambers that are placed under a distribution system which permits full replacement of liquids. An apparatus in accordance with the present invention enables a variety of test organisms, either laboratory-grown or collected from wild populations, to be exposed to creek water that flows through test chambers containing the test organisms at pre-determined time or flow intervals. The test chambers can be observed, and effects noted, at any time during the exposure. The goal of providing realistic exposure scenario that may not be achieved in prior art systems is achieved in the present invention due to the following features: Test organisms are placed in sieves (partially submerged in a bath); creek water is pumped into a distribution tray with nozzles that individually supply water to each sieve; at each pumping event, fresh creek water preferably replaces at least 90% of the water in the sieves and bath. As is known to those skilled in the art of testing, it is desirable to provide for a reference (perhaps non toxic) test for control purposes. To that end, in the present invention an identical pump-distribution-sieve-bath system is used to expose a set of control animals to a control solution maintained in a closed recycling loop. Temperature variations of the control solution are attenuated by means of submersion of solution containers in temperature control baths through which creek water is flowing at regular time intervals.

BRIEF DESCRIPTION OF THE DRAWINGS

FIG. 1 is a description of a preferred embodiment of the toxicity test unit of the present invention.

FIG. 2 describes the setup of the entire test system, including the treatment module shown in FIG. 1, the experimental control unit, and the cooling baths for the control unit.

DESCRIPTION OF A PREFERRED EMBODIMENT

Figures 1A, 1B:
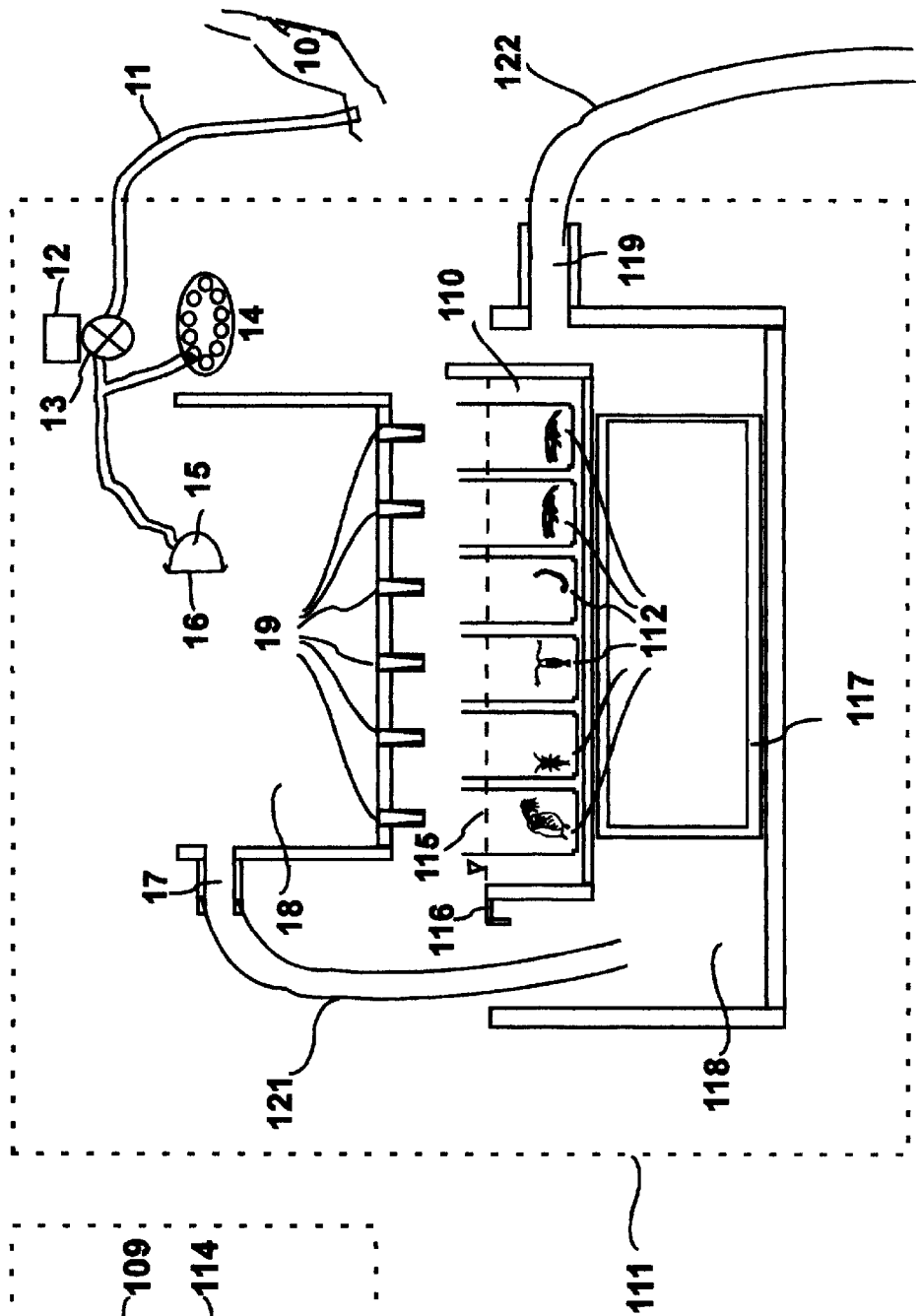
FIG. 1a shows the test chambers of the invention.
FIG. 1b shows the basic flow-through unit as the experimental treatment module according to the present invention.

In reference to FIG. 1a, The test chamber 112 is a sieve made of a film canister 109, preferably three centimeters (cm) in diameter, with the bottom cut out and a 400 micron net 113 glued to the opening. The net 113 used in the present invention may be of the type commercially available under the trademark Nitex, which is a nylon netting that may be purchased, for example, under Catalog # E-NT-NTX 400 from Argent Chemical Laboratories, 8702 157th Avenue North East, Redmond, Wash. 98052, hereinafter referred to as Argent. Aquatic test organisms 114 of various taxonomic groups are placed inside the sieves when the sieves are partially submerged in water. FIG. 1b shows the treatment module 111. Generally, the primary function of this treatment module is to provide for flow of water from the creek 10 through the test chambers 112 at preset time intervals. The sieves 112 are situated in a bath 110 that is maintained full of water at all times at water level 115, so that the aquatic test organisms 114 are constantly under water. The system accommodates test organisms as small as 500 microns in size (0.5 mm). For example, adult Ceriodaphnia dubia can be used. Using Ceriodaphnia is beneficial because there is a vast toxicity database for this particular test organism. The sieves 112 can hold other test organisms (e.g., other cladocerans, ostracods, amphipods, mayfly larvae, stonefly larvae, mosquito larvae etc.) that are up to one centimeter in size. A system with larger diameter sieves can easily be built in order to practice the invention with other size organisms. A preferred embodiment of the present invention consists of twenty six sieves for the treatment system. For illustrative clarity, only six sieves are shown in FIG. 1b.

In reference to FIG. 1b, during a pumping event, water is pumped from the creek 10 through the intake tubing 11 into the peristaltic pump 13 that is controlled by an automatic sampling device 12. The automatic sampling device 12 can be set to operate the pump so that it takes a specified volume of water at specified time intervals. The tubing leading from the pump 13 is split, one tube goes into the flow-through treatment module through plastic container 15 and the other goes into the discrete sampler 14 which collects a water sample that reflects the exposure conditions for that pumping event. The water samples from the discrete sampler 14 are taken later to the laboratory for analysis of various water quality parameters.

The water pumped into the flow-through unit passes through a filter made of a plastic container 15 having a 100 micron net 16 attached to its mouth. Net 16 used in the present invention may be a Nitex brand nylon netting, that may be purchased from Argent (Catalog # E-NT-NTX 100). Net 16 is secured on the mouth of plastic container 15 by means of the modified Snap-On lid of that same container, which has a large hole cut around the top thereby leaving a ring with the Snap-On part intact. This structure allows for quick cleaning and reassembly of the filter anytime during the test. This filter Net 16 removes particles larger than 100 micron from the water that goes into sieves 112, so that the sieve itself with net pore size of 400 microns would not become clogged by particles that remain in creek water after filtration. The filter Net 16 has preferably a large surface area and may be readily accessible for cleaning at any time during the test.

Still referring to FIG. 1b, pumped creek water from the filter Net 16, flow into the distribution tray 18 and down through the nozzles 19 into the sieves 112. Nozzles 19 are made of cut pipetor tips to assure even distribution. Because the pumping rate is faster than the rate of flow through all the nozzles, excess water builds up in the distribution tray 18 and water overflows through the spout 17 into a tubing 121 that drains into a secondary bath 118 below. This excess water accumulates to a level of about nine centimeters in the distribution tray 18 and thus the resulting water pressure at the bottom ensures that all nozzles 19 are open and enable flow even after a dry interval of several hours. The inner diameter of nozzles 19 is about 1000 microns, much larger than any creek particulates that may have been introduced into the distribution tray 18 after filtration through the 100 micron net 16.

At each pumping event, adequate volume of creek water flows from the distribution tray 18 through nozzles 19 into sieves 112 to assure that the entire volume of water inside each sieve is replaced. The water volume is preferably calibrated by pumping a pigmented solution, of known absorbance, into the system and measuring the absorbance of the solution retained in the sieve after the flow subsided. For a distribution tray 18 of two liters in volume, ninety five percent of the absorbance is typically recovered in the sieves after two and a half liters of the pigmented solution had been pumped into it.

When water flows through the sieves 112, the bath 110 overflows above the ledge 116 and into a secondary bath 118. Excess water from secondary bath 118 overflow through spout 119 into a tubing 122 draining back to the creek or into a tertiary bath as described below. Bath 110 is situated at the correct level inside secondary bath 118 by means of a support frame 117 made of plastic rods and connectors. The rods and connectors used in this invention may be purchased for example in toy stores under the brand name K'nex . Bath 110 is simply placed on frame 117 and moved laterally until the sieves 112 are exactly under the spouts 19. Thus, bath 110 with the sieves 112 in it is not connected to any tubing or structure, and can be taken out any time during the test.

The primary bath 110 with sieves 112 including its water can be taken out at desired intervals for observations and subsequently returned and reinstalled within the system within several minutes. To facilitate observation for test purposes, the bath 110 is placed on a light table (which may be a supporting frame with battery-powered illumination underneath) and the test organisms are observed from above. A magnifier glass can be used in the field if needed; alternatively, the bath 110 with sieves 112 in it can be placed directly on the table of a dissecting microscope. A real-time survival curve plotting survival against time can be obtained for each exposure scenario.

Pumping events should preferably last three minutes in the embodiment of the present invention. The preferred interval between pumping events is one hour for dry weather flow experiments. This interval facilitates a schedule of one visit to the creek every day, in order to replace the twenty four sample bottles in the automatic sampler 14 and to perform daily observations. However, different pumping intervals, possibly set according to flow increments rather than time increments, are recommended for storm event monitoring.

In reference to FIG. 2, the entire setup that practices the present invention in the field includes the treatment module 111 shown in detail in FIG. 1a, and the experimental control module 22. The experimental control module 22 is identical or similar to treatment module 111 having similar sieves, baths, distribution tray, and a pump with automatic sampling device . However the pump does not take discrete samples. The control solution is circulated in a closed loop, from reservoir 25, through intake tube 211, into the experimental control module 22. The overflow from the experimental control module's secondary bath is drained through tubing 222 into the reservoir 25.

In the field testing of the preferred embodiment of the present invention, creek water are used to maintain stable temperatures in the experimental control module 22, based on the assumption that creek water temperatures are less extreme than air temperatures. The overflow from the secondary bath of the experimental treatment module 111 are directed through tubing 122 into a larger container, tertiary bath 29, that surrounds the secondary bath of the experimental control module 22 and its support frame 219. From tertiary bath 29, water overflows through the spout 212 into another large container 213 in which the control water reservoir 25 is immersed. Excess creek water exits the entire system through spout 214 into tubing 215 which leads back to the creek.

What is claimed is:

1. An apparatus for testing responses of selected organisms to contents of sample fluid, said apparatus having retaining means for retaining said selected organisms submerged in said sample fluid; and filter means attached to said retaining means wherein the filter means are permeable to said sample fluid flow and not permeable to said selected organisms; and bath means containing said retaining means; and secondary bath means containing said bath means; and pump means for causing said sample fluid flow consecutively through said retaining means and said filter means and said bath means and said secondary bath means; and means for optically observing the response of said selected organisms to contents of said sample fluid without removing either said selected organisms from said retaining means or said retaining means from said bath means.

2. The apparatus of claim 1 wherein said contents of sample fluid are toxics.

3. The apparatus of claim 1 wherein the observed response is mortality of said selected organisms.

4. The apparatus of claim 1 wherein said selected organisms are Ceriodahnia.

5. The apparatus of claim 1 wherein said sample fluid is creek water.

6. A testing system comprised of a first (control) testing apparatus in accordance with claim 1 and at least one additional testing apparatus in accordance with claim 4 wherein said selected organisms in the first testing apparatus are of the same type as those in said at least one additional testing apparatus; and said sample fluid in the first testing apparatus is a control sample fluid; and wherein said testing system further has comparison means for comparing the optically observed response of said selected organisms in the first testing apparatus to that of said selected organisms in said at least one additional testing apparatus.

7. The testing system of claim 6 wherein said contents of sample fluid in the at least one additional testing apparatus are toxics.

8. The testing system of claim 6 wherein the optically observed response is mortality of said selected organisms.

9. The testing system of claim 6 wherein said selected organisms are Ceriodaphnia.

10. The testing system of claim 6 wherein said sample fluid in the at least one additional testing apparatus is creek water.

11. A method for testing responses of selected organisms to contents of sample fluid, said method comprising the steps of retaining said selected organisms in a retaining device submerged in said sample fluid; and filtering said sample fluid within said retaining device wherein said filtering is permeable to said sample fluid flow and not permeable to said selected organisms; and containing said retaining device within a bath; and containing said bath within a secondary bath; and causing sample fluid flow consecutively through said retaining device and said bath and said secondary bath; and optically observing the response of said selected organisms to contents of said sample fluid without removing either said selected organisms from said retaining device or said retaining device from said bath.

12. The method of claim 11 wherein said contents of sample fluid are toxics.

13. The method of claim 11 wherein the optically observed response is mortality of said selected organisms.

14. The method of claim 11 wherein said selected organisms are Ceriodaphnia.

15. The method of claim 11 wherein said sample fluid is creek water.

* * * * *